United States Patent [19]

Peter et al.

[11] 3,759,959

[45] Sept. 18, 1973

[54] ANTHRAQUINOID DYESTUFFS

[75] Inventors: Richard Peter; Hans-Joerg Angliker; Angelo Della Casa, all of Basel, Switzerland

[73] Assignee: Ciba-Geigy AG, Basel, Switzerland

[22] Filed: Nov. 16, 1971

[21] Appl. No.: 199,345

Related U.S. Application Data

[63] Continuation-in-part of Ser. No. 843,834, July 22, 1969, Pat. No. 3,663,557.

[30] Foreign Application Priority Data

July 26, 1968 Switzerland.................... 11234/68

[52] U.S. Cl................. 260/376, 260/371, 260/372, 260/373, 260/377, 260/378, 260/380, 260/381

[51] Int. Cl. ......................... C09b 1/32, C09b 1/50

[58] Field of Search.................... 260/372, 376, 377

[56] References Cited
UNITED STATES PATENTS 3,560,491  2/1971  Neeff.................................. 260/377

Primary Examiner—Lorraine A. Weinberger
Assistant Examiner—E. Jane Skelly
Attorney—Harry Goldsmith et al.

[57] ABSTRACT

An anthraquinoid dyestuff which comprises at least one residue of an anthraquinoid disperse dyestuff and at least one residue of a disperse dyestuff of the styryl series.

5 Claims, No Drawings

ANTHRAQUINOID DYESTUFFS

CROSS-REFERENCE TO RELATED APPLICATION

This application is a continuation-in-part of application Ser. No. 843,834, filed July 22, 1969, now U.S. Pat. No. 3,663,557.

The present invention provides dyestuffs, which are preferably free from sulphonic acid groups and in which the residue of an anthraquinoid dyestuff is linked with a residue of a styryl dyestuff.

The residue of the styryl dyestuff may be either a negative group linked with the double bond of the styryl grouping, for example, a sulphonamide group of a carboxyl ester group, linked with the residue of the anthraquinoid dyestuff; or, preferably, it is linked through an alkyl group, which is attached to the nitrogen atom in the paraposition of the styryl residue and which may contain any desired substituents. Accordingly, preferred anthraquinone dyestuffs are those which contain a styryl residue of the formula

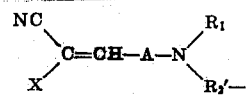

in which $R_1$ represents an unsubstituted or substituted alkyl group, $R_2'$ represents an unsubstituted or substituted alkylene residue, A represents an unsubstituted or substituted para-phenylene residue and X represents a negative substituent, for example, a cyano, carbalkoxy, carbonamido or arylsulphonyl group.

Another preferred type of the new dyestuffs are anthraquinone dyestuffs that contain a resuide of the formula

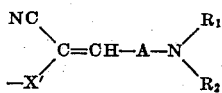

in which A and $R_1$ have the meanings given above, $R_2$ has the same meaning as $R_1$, and the residues $R_1$ and $R_2$ may be identical or different from each other, and X' represents a residue bound to the residue of the styryl dyestuff through an -SO$_2$- or -CO- bridge, being for example an -SO$_2$-arylene, -SO$_2$-N-(alkyl)-alkylene, -CO-N-(alkyl)-alkylene or -CO-O-alkylene residue, in which alkyl and alkylene represent unsubstituted or substituted alkyl, aralkyl or cycloalkyl groups having one or two free valences respectively.

carbonyloxy residue derived from the corresponding anthraquinonesulphonic or -carboxylic acid.

Valuable dyestuffs are those of the formula

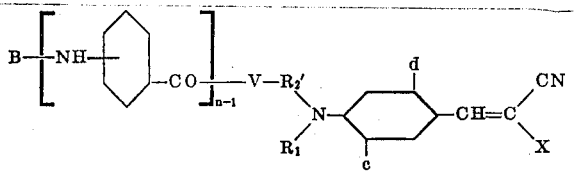

in which V represents a hydroxyl or imino group, $R_1$ represents an unsubstituted or substituted alkyl group or a residue of the formula

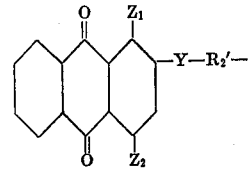

$R_2'$ represents an unsubstituted or substituted alkylene group, Y represents an -SO$_2$- or preferably a -CO- group; $n = 1$ or 2; $c$ and $d$ each represents a hydrogen or chlorine atom or a methyl, ethyl, methoxy or ethoxy group; X represents a carbalkyl group, a carbonamide group, an arylsulphonyl or a cyano group, and B represents a residue of one of the formulae

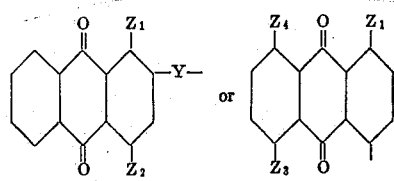

in which $Z_1$ is an amino group which may be alkylated, or a hydroxyl group, $Z_2$ represents an amino group which may be alkylated or a nitro group or a bromine atom, and $Z_3$ and $Z_4$ each represents a nitro or hydroxyl group or an amino group which may be alkylated.

Of special value are, for example, the dyestuffs of the formulae

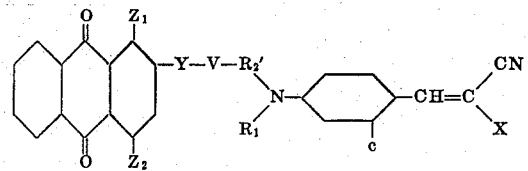

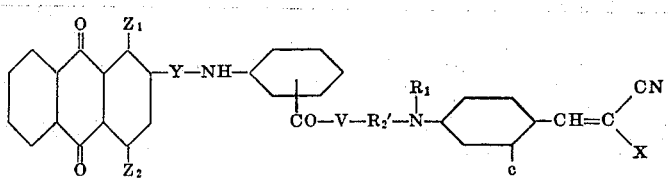

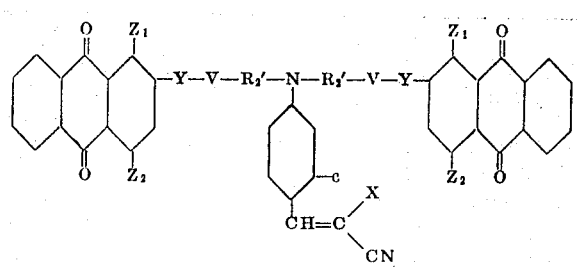

The anthraquinoid residues may be anthraquinone residues bound to the styryl dyestuffs (1) in the α-position or (2) in the β-position.

Anthraquinones substituted in α-position contain, for example, a substituted amino group or aminophenylamino group which carries the residue of a styryl dyestuff.

Anthraquinones substituted in β-position contain in the linking position, for example, a sulphonyloxy or and

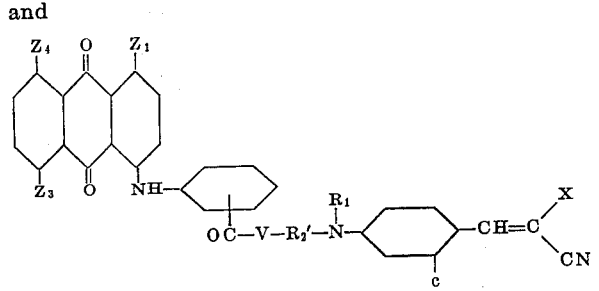

Of particular importance is the dyestuff of the formula

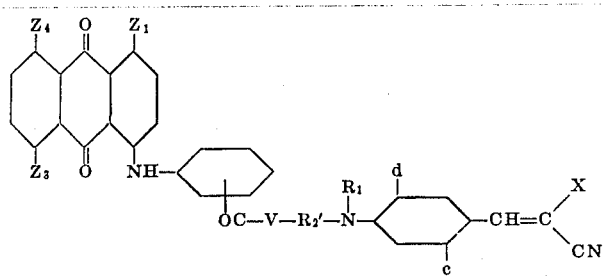

in which
$Z_1$ is OH, $NH_2$ or $NHR_3$ where $R_3$ is methyl or ethyl,
$Z_2$ is $NO_2$, Br, $NH_2$ or $NHR_3$ where $R_3$ is methyl or ethyl,
$Z_3$ and $Z_4$ are each, independently,
$NO_2$, OH, $NH_2$ or $NHR_3$ where $R_3$ is methyl or ethyl,
V is -O- or -NH-,
$R_2'$ is $C_1$-$C_4$-alkylene,
$R_1$ is unsubstituted $C_1$-$C_4$ alkyl or $C_1$-$C_4$ alkyl substituted by
  cyano, chloro, $C_1$-$C_4$ alkoxy, hydroxy, $C_1$-$C_4$ alkoxycarbonyl, $C_1$-$C_4$ alkylcarbonyloxy, $C_1$-$C_4$ alkylcarbamoyloxy, phenylcarbamyloxy, $C_1$-$C_4$ alkoxycarbonyloxy, phenyloxycarbonyloxy, cyanoethoxy, phenyl, chloracetoxy, or benzoyloxy,
c and d are each, independently, H, Cl, $CH_3$, $C_2H_5$, $OCH_3$, $OC_2H_5$, phenylthio or phenoxy,
and
X is $C_1$-$C_3$ carbalkoxy,
$C_1$-$C_3$-alkylcarbonamido,
phenylsulfonyl or cyano.

The groups $R_1$ and $R_2'$ each represent alkyl groups containing one to four, preferably two to four, carbon atoms, for example, methyl, ethyl, propyl or n-butyl groups which may be substituted in the usual manner, for example, arylalkyl residues, for example, benzyl or β-phenethyl residues, halogenated alkyl groups, for example, β-chloroethyl, β,β,β-trifluoroethyl, β,γ-dichloropropyl, β-cyanoethyl, β-cyano-ethoxyethyl, alkoxyalkyl, for example, β-methoxyethyl, β-ethoxyethyl or δ-methoxy-butyl, glycidyl, hydroxyalkyl, for example, β-hydroxyethyl, β,γ-dihydroxypropyl, nitroalkyl, for example, β-nitroethyl, carbalkoxy, for example β-carbo (methoxy, othoxy or propoxy)-ethyl [in which the terminal alkyl group may carry in the ω-position cyano, carbalkoxy and acyloxy groups], β- or γ-carbo(-methoxy or ethoxy)propyl, acylaminoalkyl, for example, β-(acetyl or formyl)-aminoethyl, acyloxyalkyl, for example, β-acetyloxyethyl, β-propionyloxyethyl, β-butyryloxyalkyl, β,γ-diacetoxypropyl, γ-acetylaminopropyl, γ-propionylaminopropyl, β-(alkyl or aryl)-sulphonylalkyl, for example, β-methanesulphonylethyl, β-ethanesulphonylethyl, β-(parachlorobenzenesulphonyl)-ethyl, alkyl- or arylcarbamoyloxyalkyl, for example, β-methylcarbamyloxyethyl and β-phenylcarbamyloxyethyl, alkyloxycarbonyl-oxyalkyl, for example, β-(methoxy, ethoxy or isopropoxy)-carbonyloxyethyl, γ-acetamidopropyl, β-(para-nitrophenoxy)-ethyl, β-(parahydroxyphenoxy)-ethyl, β-(β'-acetylethoxycarbonyl)-ethyl, β-[(β'-cyano-, hydroxy-, methoxy- or acetoxy)-ethoxycarbonyl]-ethyl, cyanoalkoxyalkyl, β-carboxyethyl, β-acetylethyl, γ-aminopropyl, β-diethylaminoethyl, β-cyanoacetoxyethyl and β-benzoyl- or β-(para-alkoxy or phenoxy-benzoyl-ethoxy groups.

Generally, the group $R_1$ contains no more than 18 carbon atoms.

The group $R_2'$ is an alkyl group containing one to four carbon atoms, which may contain one or more substituents, for example, hydroxyl or acyloxy groups.

The present invention also provides a process for preparing the above-mentioned dyestuffs, wherein a reactive anthraquinone derivative is condensed with a reactive styryl dyestuff and, if desired, acylated with a fibre-reactive acylating agent.

Preferred reactants are those of which one contains a labile negative group and the other a substitutable nucleo-philic group, for example, a hydroxyl, mercapto or amino group. It is also possible to carry out other reactions on active double bonds.

A. Starting compounds of the styryl series
  (I) Reactive styryl dyestuffs that contain a labile negative residue, for example the styryl dyestuffs of the formulae

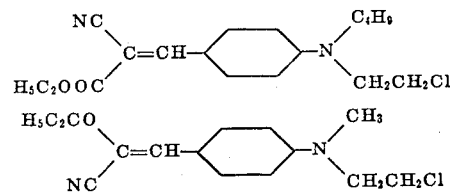

and

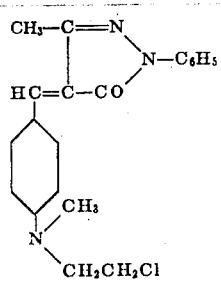

and

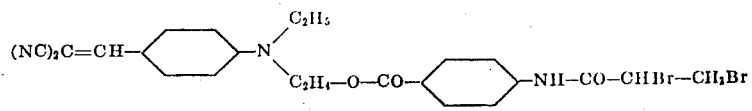

(described in Swiss Pat. application Ser. No. 6350/68 — Case 6448).

(II) Reactive styryl dyestuffs that contain a nucleophilic substitutable residue, for example, the dyestuffs of the formulae

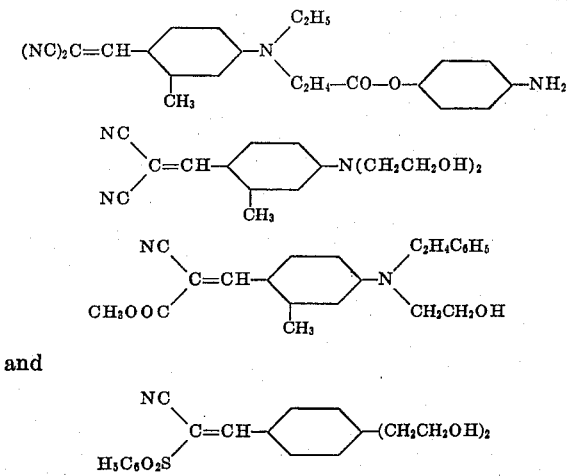

and

The styryl dyestuffs can be prepared in the usual manner by way of the Vilsmeyer reaction from a dialkylaniline and condensation of the intermediately formed γ-formylaniline with a methylene-active compound.

Methylene-active compounds of the formula $NC-CH_2-X$ suitable for the reaction are, for example:
  malonic acid dinitrile,
  cyanoacetic acid methyl ester, ethyl ester and butyl ester,
  cyanoacetamide,
  cyanoaceto dimethylamide and methylamide,
  methylsulphonyl acetonitrile,
  phenylsulphonylacetonitrile and
  para-toluylsulphonylacetonitrile.

B. Starting compounds of the anthraquinone series (I) Starting compounds that contain a negative group which is labile (i.e. can be eliminated)

1. Anthraquinone compounds that contain a negative mobile substituent in the α-position, for example:
  1-halogenanthraquinones, preferably 1-bromo- or 1-chloro-anthraquinones, for example,
  1-bromo-4-methoxyanthraquinone,
  1-bromo-3-phenyloxy-4-aminoanthraquinone,
  1-amino-4-bromo-anthraquinone-2-carboxylic acid-N,N-dimethylamide,
  1-amino-4-chloro-2-methoxycarbonyl-anthraquinone,
  1-amino-4-bromo-2-methoxycarbonyl-anthraquinone,
as well as anthraquinones that contain active halogen atoms, for example:
  1-hydroxy-4-(3-chlorocarbonylphenyl)-amino-anthraquinone and
  1-amino-2-bromo-4-(3'-nitro-4'-chlorophenylsulphonyl)-amino-anthraquinone.

Another group of starting materials comprises the 1-nitro-anthraquinones which can be reacted with a styryl dyestuff containing a primary amino group by a method known per se, with replacement of the nitro group by the amino group, for example, 1,5-dihydroxy-4,8-dinitro-anthraquinone. Moreover, there should be mentioned in this connection those α-hydroxyanthraquinones which in the presence of a reducing agent exchange hydroxyl groups for amino residues, especially 1,4-dihydroxyanthraquinone whose hydroxyl groups can be considered to be negative residues for the present purpose.

Furthermore, there should be mentioned anthraquinone derivatives that contain in α-position one or several fibre-reactive groups, for example:
  1-[4'-(4''-chloro-6''-methoxy-1'', 3'', 5''-triazinyl-2''-amino)-anilino]-anthraquinone,
  1,4-bis-(γ-chloro-β-hydroxy-propylamino)-anthraquinone,
  1-β-hydroxyethylamino-4-(γ-chloro-β-hydroxy-propylamino)-anthraquinone,
  1-methylamino-4-(γ-chloro-β-hydroxy-propyl)-amino-anthraquinone,
  1-(γ-chloro-β-hydroxypropyl)-amino-4-(4'-methylcyclohexylamino)-anthraquinone,
  1-methylamino-4-[2'-chloro-4'-bis-(hydroxyethyl)-amino-1',3',5'-triazinylamino]-anthraquinone,
  1-methylamino-4-(2'-bromoethylamino)-anthraquinone,
  1,4-bis-(γ-bromopropylamino)-anthraquinone,
  1-amino-4-(3'-chloroacetyl-anilino)-anthraquinone,
and the dyestuffs of the formulae

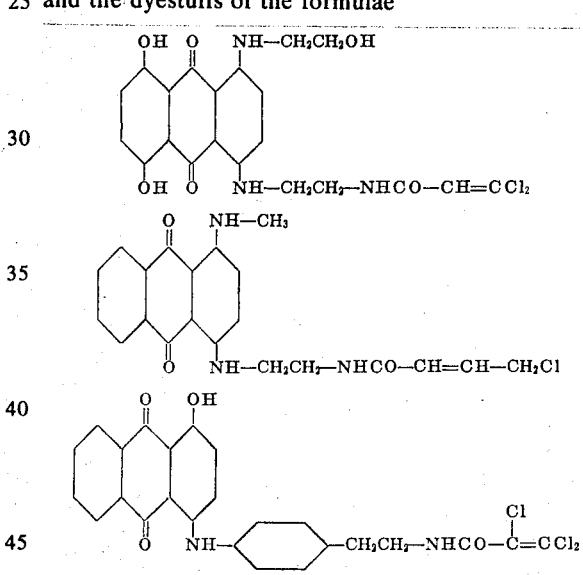

and

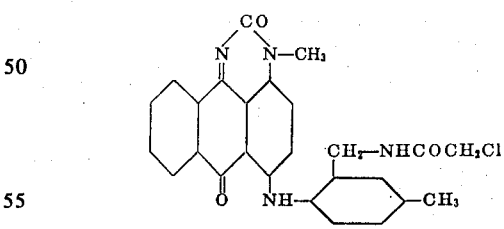

2. Anthraquinoid starting dyestuffs containing labile negative groups, linked in the β-position, are the following compounds:
  1-amino-4-nitroanthraquinone-2-carboxylic acid chloride,
  1-amino-4-(4'-carbonamidophenyl)-aminoanthraquinone-2-carboxylic acid chloride,
  1,4-dihydroxy-2-chloromethylphenylmercapto-anthraquinone,
as well as the compounds of the formulae

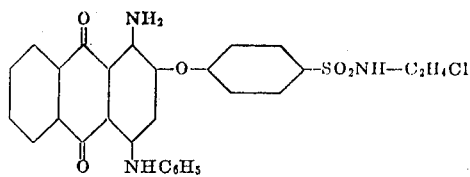

and

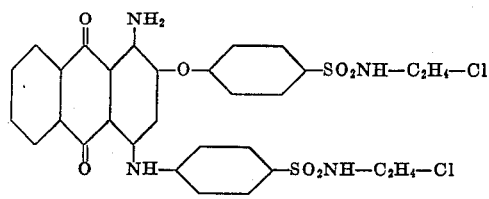

(II) Anthraquinone dyestuffs containing nucleophilic substitutable groups are, for example:
1-amino- and 2-amino-anthraquinone,
1-amino-5-chloro-8-hydroxyanthraquinone,
1-amino-2-bromo-anthraquinone,
1-amino-5-hydroxy-6,8-dichloro-anthraquinone,
1-amino-5,8-dichloro-anthraquinone,
1-amino-5-nitro-anthraquinone,
1-amino-5-chloro-8-methoxy-anthraquinone,
1-amino-7-chloro-anthraquinone,
1-amino-6-chloro-anthraquinone,
1-amino-6- or -7-fluoro-anthraquinone,
1-amino-6- or 7-bromo-anthraquinone,
1-amino-6,7-dichloro-anthraquinone,
1-amino-6,7-difluoro-anthraquinone,
1-amino-2-($\beta$-hydroxyethyloxy)-4-hydroxy-anthraquinone,
1-amino-2-bromo-anthraquinone,
1-amino-2-methyl-anthraquinone,
1-($\beta$-aminoethylamino)-4-acetylamino-anthraquinone,
1-($\beta$-aminoethylamino)-anthraquinone,
1-acetylamino-4-hydroxy-anthraquinone,
1-amino-4-hydroxy-anthraquinone,
1-amino-4-chloro-anthraquinone,
1-amino-4-guanidino-anthraquinone,
1-amino-4-($\beta$-hydroxyethylamino)-anthraquinone,
1-amino-2,4-dibromo-anthraquinone,
1-(2-hydroxyethylamino)-anthraquinone,
1-amino-2-isopropylmercapto-anthraquinone,
1-amino-2-methoxy-4-hydroxy-anthraquinone,
1,2-diamino-anthraquinone,
1-hydroxy-anthraquinone,
2-hydroxy-anthraquinone,
1,2-dihydroxy-anthraquinone,
1,4-dihydroxy-anthraquinone,
1,8-dihydroxy-anthraquinone,
1,2,4-trihydroxy-anthraquinone,
2,6-dihydroxy-anthraquinone,
1,2,5,8-tetrahydroxy-anthraquinone,
1,2,4,5,6,8-hexahydroxy-anthraquinone,
1-hydroxy-4-acetylamino-anthraquinone,
1,4-diamino-anthraquinone,
1,4-diamino-2-cyano-anthraquinone,
1,4-diamino-2-methoxy-anthraquinone,
1,4-diamino-2-carbamoyl-anthraquinone,
1,4-diamino-5-nitro-anthraquinone,
1,4-diamino-2,3-dimethoxy-anthraquinone,
1,4-diamino-2,3-dicyano-anthraquinone,
1,4-bis-(para-amino-anilino)-5-hydroxy-anthraquinone,
1,4-bis-(para-amino-anilino)-5,8-dihydroxy-anthraquinone,
1,4-bis-(para-amino-anilino)-anthraquinone,
1,5-bis-(para-amino-anilino)-2-methyl-anthraquinone,
1,5-bis(para-amino-anilino)-4,8-dihydroxy-anthraquinone,
1,5-bis-(para-amino-anilino)-2-($\beta$-hydroxyethylmercapto)-anthraquinone,
1,5-bis-($\beta$-hydroxyethylamino)-anthraquinone,
1,4-dihydroxy-2-($\beta'$-hydroxyethyl-$\beta$-hydroxyethyl)-anthraquinone,
1,4-dihydroxy-2-($\beta'$-hydroxyethyl-$\beta$-mercaptoethyl)-anthraquinone,
1,4-dihydroxy-2-($\beta''$-hydroxyethyl-$\beta'$-hydroxyethyl-$\beta$-hydroxyethyl)-anthraquinone,
1,6-diamino-anthraquinone,
1,8-diamino-anthraquinone,
1,8-diamino-2-methyl-anthraquinone,
1-methylamino-2-isopropylmercapto-anthraquinone,
1-methylamino-4-butylamino-anthraquinone,
1-anilino-2-chloro-4-amino-anthraquinone,
1-methylamino-4-(para-amino-anilino)-anthraquinone,
1-methylamino-anthraquinone,
1,4,5-triamino-anthraquinone,
1,4,5-trihydroxy-anthraquinone,
1,4,5,8-tetraamino-anthraquinone,
1,4,5,8-tetrahydroxy-anthraquinone,
1-(amino- or hydroxy-(-4-methoxy, -ethoxy-, -propoxy-, -isobutoxy- or cyclohexyloxy)-anthraquinone,
1-(amino- or hydroxy-)-4- or -5-[2',3'- or 4'-(chloro-, fluoro-, bromo-, methyl-, methoxy-, $\beta$-methoxyethyl-, -cyano- or trifluoromethyl)-phenylamino]-anthraquinone,
1-(amino- or hydroxy)-4- or -5-[2', 3' or 4'-(chloro-, fluoro-, bromo-, methyl-, methoxy- or ethyl)-benzoyl-amino]-anthraquinone,
1-(amino- or hydroxy)-4- or -5-(methyl-, ethyl-, propyl-, isopropyl-, butyl, isobutyl- or tertiary butyl-, $\beta$-methoxyethyl-, $\beta$-cyanoethyl- or chloromethyl)-carbonyl-amino-anthraquinone,
1-(amino- or hydroxy)-4- or -5-(methyl-, ethyl-, propyl-, $\beta$-methoxyethyl or $\beta$-cyanoethyl)-amino-anthraquinone,
1,5-diamino-4,8-dihydroxy-2-($\beta$-hydroxyethylmercapto)-anthraquinone,
1-amino-4-cyclohexylamino-2-anthraquinone carboxamide,
1,4-diamino-2,3-anthraquinone dicarboximide,
1-hydroxy-4-amino-2,3-anthraquinone dicarboximide,
1,4-diamino-anthraquinone-2,3-dicarboxylic acid-$\beta$-hydroxy-ethylimide,
4- or 5-amino-1,9-isothiazolanthrone,
4- or 5-amino-1,9-anthrapyrimidine,
4- or 5-amino-pyrazolanthrone,
2- or 3-amino-benzanthrone,
and the dyestuffs of the formulae

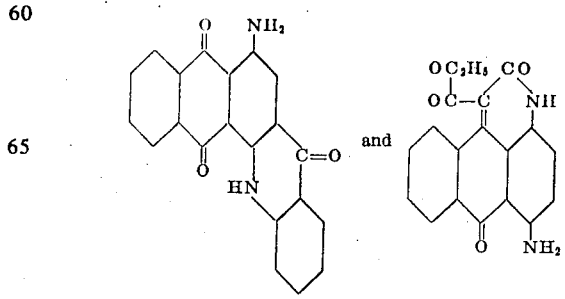

Compounds belonging to the 2- or 3-phenyl-anthraquinones substituted in position 1,4,5,8 are the following:

1,5-dihydroxy-4,8-diamino-2- or -3-(3'-methoxy-4'-hydroxy-phenyl)-anthraquinone,
1,5-dihydroxy-4,8-diamino-2- or -3-(4'-hydroxy-phenyl)-anthraquinone,
1,5-dihydroxy-4,8-diamino-2- or -3-(4'-hydroxy-2'-methyl-phenyl)-anthraquinone,
1,5-dihydroxy-4,8-diamino-2- or -3-(4'-hydroxy-phenyl)-6- or -7-bromo-anthraquinone and
1,5-dihydroxy-4,8-diamino-2- or -3-(4'-hydroxy-3'- or 2'-bromophenyl)-anthraquinone.

It is preferable to start from anthraquinone derivatives that contain amino groups, advantageously only one amino group, as reactive group.

The reaction can be illustrated by the following typical reaction courses:

1,5-dihydroxy-4,8-dinitro-anthraquinone +

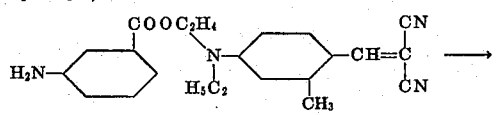

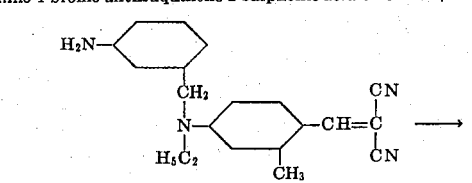

1-amino-4-bromo-anthraquinone 2-sulphonic acid chloride +

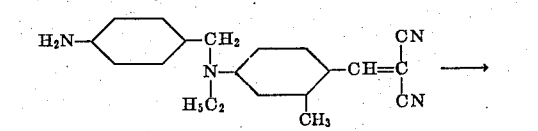

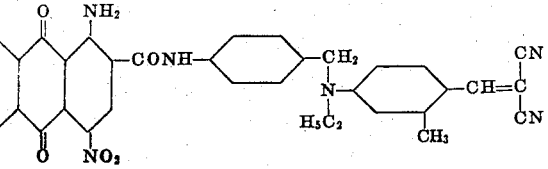

1-amino-2-chlorocarbonyl-4-nitroanthraquinone +

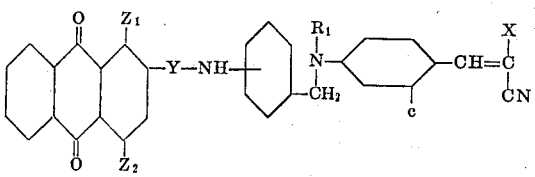

By the two last-mentioned reactions there are formed dyestuffs of the general formula

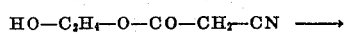

in which $Z_1$, $Z_2$, Y, $R_1$, c and X have the meanings defined above.

1-amino-2-chlorocarbonyl-4-nitroanthraquinone +

$HO-C_2H_4-O-CO-CH_2-CN \longrightarrow$

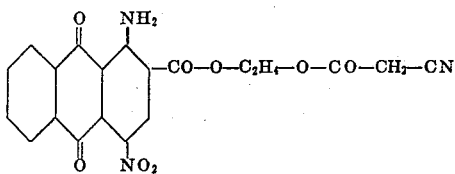

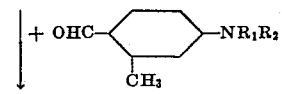

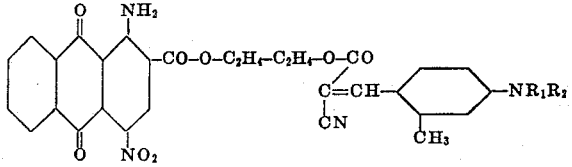

| reduction

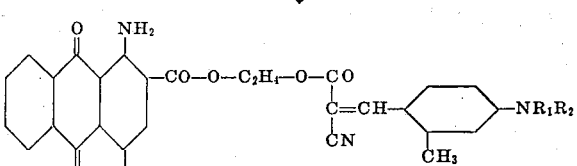

in which $R_1$ and $R_2$ have the same meanings as above.

In general, the reaction is carried out in an organic solvent, for example, tetrahydrofuran, dimethyl-glycol ether, dioxan, chlorobenzene, nitrobenzene, dimethylformamide or sulpholan, or in an acid-binding organic medium, for example, pyridine.

Acylation with fibre-reactive acylating agents

The anthraquinoid dyestuffs containing at least one residue of a styryl dyestuff, prepared according to this invention, can subsequently be treated with a fibre-reactive acylating agent provided they contain acylable groups, especially acylable amino groups.

By reaction with the corresponding halides or, if desired, anhydrides there are obtained dyestuffs which are sparingly soluble or insoluble in water, whose molecule contains at least one fibre-reactive group, for example, s-triazinyl residues, which carry on the triazine ring 1 or 2 chlorine or bromine atoms, pyrimidyl residues which carry one or two chlorine atoms or one or two arylsulphonyl or alkanesulphonyl groups on the pyrimidine ring, mono- or bis-(γ-halogeno-β-hydroxypropyl)-amino groups, β-halogenethylsulphamyl residues, β-halogenethoxy groups, β-halogenethylmercapto groups, γ-halogeno-β-hydroxypropylsulphamyl residues, chloroacetylamino groups, vinylsulphonyl groups, 2,3-epoxypropyl groups or other fibre-reactive residues, preferably such as are free from groups imparting solubility in water.

(III) Use

The dyestuffs described above contain no acid groups imparting solubility in water, especially no sulphonic acid groups, so that they are sparingly soluble to insoluble in water.

The water-insoluble dyestuffs, mixtures of such water-insoluble dyestuffs and their mixtures with other dye-stuffs are extremely suitable — especially after having been finely dispersed, for example by grinding, pasting or precipitation — for dyeing or printing synthetic fibres such, for example, as acrylic or acrylonitrile fibres, polyacrylonitrile fibres and copolymers of acrylonitrile and other vinyl compounds, for example, acrylic esters, acrylamides, vinylpyridine, vinylchloride or vinylidenechloride, copolymers of dicyanoethylene and vinylacetate, also acrylonitrile block copolymers, fibres of polyurethanes, polyolefins, cellulose tri- and 2½-acetate, polyamides, for example, nylon 6, nylon 6.6 or nylon 12, and more especially fibres of aromatic polyesters such as of terephthalic acid and ethyleneglycol or 1,4-dimethylolcyclohexane, and copolymers of terephthalic or isophthalic acid and ethyleneglycol.

Accordingly, the present invention also provides a process for dyeing or printing synthetic fibres, especially polyester fibres, wherein a dyestuff of anthraquinoid nature, which is free from sulphonic acid groups and contains at least one residue of a styryl dyestuff, a mixture of such a dyestuff, or a mixture of such a dyestuff with another dyestuff, is used.

For dyeing, the water-insoluble dyestuffs are advantageously used in a finely dispersed form and dyeing is carried out in the presence of a dispersant, for example, sulphite cellulose waste liquor or of a synthetic detergent, or of a combination of different wetting and dispersing agents. As a rule, it is advantageous to convert the dyestuffs to be used in a dye preparation before dyeing, which preparation contains a dispersant and the finely dispersed dyestuff in such a form that when the dyestuff preparation is diluted with water a fine dispersion results. Such dyestuff preparations can be manufactured by a method known per se, for example by grinding the dry or wet dyestuff with or without addition of a dispersant during grinding. It is also possible to dye the afore-mentioned synthetic fibres in a solution of the dyestuff in an organic solvent.

In aiming at strong dyeings on polyethyleneterephthalate fibres it proved advantageous to add a swelling agent to the dyebath, or to carry out the dyeing process under super-atmospheric pressure at a temperature above 100° C, for example at 120° C. Suitable swelling agents are aromatic carboxylic acids, for example benzoic or salicylic acid, phenols, for example ortho- or para-hydroxydiphenyl, salicylic acid methyl ester, aromatic halogen compounds, for example chlorobenzene, ortho-dichlorobenzene or trichlorobenzene, phenylmethylcarbinol or diphenyl. For dyeing under super-atmospheric pressure it is advantageous to make the dyebath slightly acidic, for example by adding a weak acid, for example, acetic acid, to it.

The dyestuffs to be used according to this invention are especially suitable for dyeing by the so-called thermosetting process according to which the fabric to be dyed is impregnated with an aqueous dispersion of the dyestuff, which advantageously contains 1 to 50 % of urea and a thickener, especially sodium alginate, preferably at a temperature not exceeding 60° C and then to express it by a method known per se.

For fixing the dyestuff on it, the fabric thus impregnated, advantageously after first having been dried, for example in a current of warm air, is heated to a temperature above 100° C, for example a temperature within the range from 180° to 210° C.

The above-mentioned thermosetting process is especially suitable for dyeing union fabricas of polyester fibres and cellulose fibres, especially cotton. In this case the padding liquor contains, in addition to the unquaternated water-insoluble dyestuff to be used according to this invention, also dyestuffs suitable for dyeing cotton, or especially so-called reactive dyestuffs, that is to say dyestuffs that can be fixed on the cellulose fibre with formation of a chemical bond, thus, for example, dyestuffs that contain a chlorotriazine or chlorodiazine residue. In the latter case it has been found advantageous to add an acid acceptor, for example, a carbonate, phosphate, borate or perborate of an alkali metal, or a mixture thereof, to the dyebath. When vat dyestuffs are used, the padded fabric is first heat-treated and then treated with an aqueous alkaline solution of one of the reducing agents conventionally used in vat dyeing.

The dyeing on polyester fibres obtained by the present process are advantageously subjected to an aftertreatment, for example, by heating them with an aqueous solution of a nonionic detergent.

The dyestuffs used in the present process may be applied by printing instead of by impregnation. For this purpose, for example, a printing ink is used that contains in addition to the auxiliaries generally used in printing for example, wetting and thickening agents, the finely dispersed dyestuff, if desired in admixture with one of the above-mentioned cotton dyestuffs, if desired in the presence of urea and/or of an acid acceptor.

Furthermore, it is also possible to dye or print in an organic liquor, for example in a mixture of perchloroethylene and sufficient dimethylacetamide to enable the dyestuff to dissolve in the dye liquor.

The new dyestuffs can also be used for spin-dyeing polyamides, polyesters or polyolefins. The polymer to be dyed is advantageously admixed with the dyestuff in the form of a powder, granules or chips, as a ready spinning solution or in the molten state, and the dyestuff is used in the dry state or in the form of a dispersion or solution in a solvent which, if desired, may be volatile.

The dyestuffs of the present invention can also be used for mass dyeing polymers of acrylonitrile, or polyolefins and other plastic masses, also for colouring oil paints and lacquers. If desired, the above-mentioned thermosetting process may be applied.

Some of the new dyestuffs are valuable pigments that can be used for a wide variety of pigment applications, for example in the finely dispersed form for dyeing rayon and viscose or cellulose ethers and esters, for the manufacture of inks, especially inks for ballpens, as well as for the manufacture of coloured lacquers or lake formers, solutions and products of acetylcellulose, nitrocellulose, natural or synthetic resins, for example, polymerization or condensation resins, for example aminoplasts, alkyd resins, phenoplasts, polyolefins, for example, polystyrene, polyvinylchlordie, polyethylene, polypropylene, polyvinylchloride, rubber, casein, silicone and silicone resins.

The following Examples illustrate the invention. Unless otherwise indicated, the parts and percentages are by weight.

EXAMPLE 1

16.5 Parts of 1-amino-4-nitroanthraquinone-2-carboxylic acid chloride and 13.5 parts of a styryl dyestuff of the formula

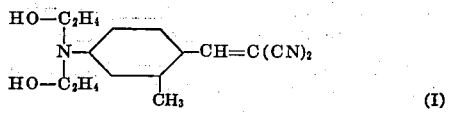

in chlorobenzene are stirred for 16 hours in an oilbath maintained at 140° C. The cooled mixture is suction-filtered and the filter cake washed with chlorobenzene. The residue is suspended in warm methanol, again suction-filtered and washed with methanol until the filtrate runs colourless. After drying, a product of the formula

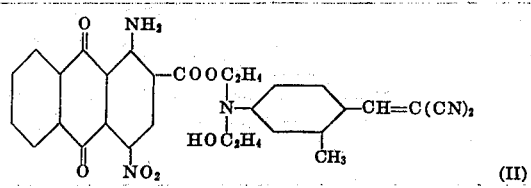

is obtained; this dyestuff dyes polyester fibres yellow shades.

11.3 Parts of the dyestuff of the formula (II) and 40 parts of acetic anhydride are stirred for 2 hours in an oilbath maintained at 140° to 150° C, then poured out over ice, the whole is left to stand for 1 hour and then suction-filtered, thoroughly washed with water and dried, to give an almost quantitative yield of the dyestuff of the formula

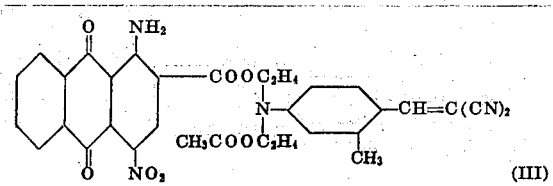

which dyes polyester fibres yellow shades.

The catalytic hydrogenation of the dyestuff of the formula (III) in dimethylformamide in the presence of Raney nickel gives, after the calculated quantity of hydrogen gas has been absorbed, an almost theoretical yield of the dyestuff of the formula

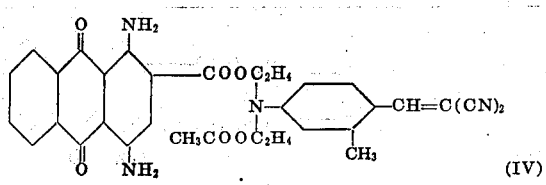

which dyes polyester fibres vivid green shades having good fastness properties.

An analogous reaction produces the dyestuffs of the formula

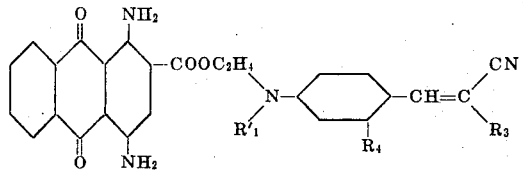

| R'₁ | R₄ | R₃ |
|---|---|---|
| —C₂H₄CN | —H | —CN |
| —C₂H₄CN | —H | —COOC₂H₅ |
| —C₂H₅ | —CH₃ | —SO₂—C₆H₅ |
| —CH₂—C₆H₅ | —CH₃ | —CN |
| —C₂H₅ | —Cl | —CN |
| —C₂H₅ | —OCH₃ | —CN |
| —C₂H₅ | —OCH₃ | —CONH₂ |
| —C₂H₄OCH₃ | —H | —CN |
| —C₂H₄OC₂H₄CN | —CH₃ | —CN |
| —C₂H₄—C₆H₅ | —CH₃ | —CN |
| —C₂H₄—O—CO—C₆H₅ | —CH₃ | —CN |
| —C₂H₄—O—CO—C₆H₄—Cl(—p) | —CH₃ | |
| —C₂H₄—O—CO—C₂H₅ | —CH₃ | —CN |
| —C₂H₄—O—CO—O—C₂H₅ | —CH₃ | —CN |
| —C₂H₄—O—CO—NH—C₄H₉ | —CH₃ | —CN |

EXAMPLE 2

3.3 Parts of 1-amino-4-nitro-anthraquinone-2-carboxylic acid chloride and 3.74 parts of a styryl dyestuff of the formula

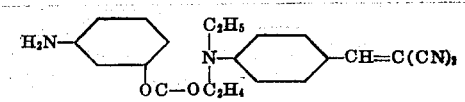

in chlorobenzene are stirred for 16 hours on an oilbath maintained at 140° C. The cooled reaction mixture is suctioned off, washed with chlorobenzene and then with methanol, and dried. 6 Parts of the resulting dyestuff of the formula

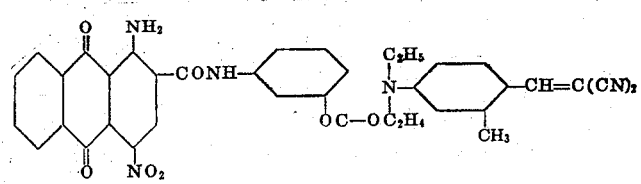

(which dyes polyester fibres yellow shades) are catalytically hydrogenated in 50 parts of dimethylformamide in the presence of Raney nickel, until the calculated quantity of hydrogen has been absorbed. The resulting dyestuff of the formula

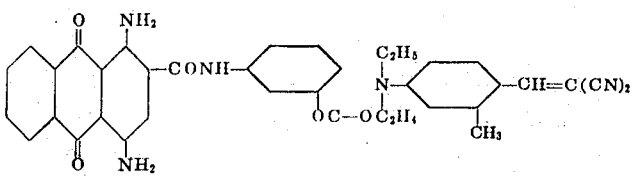

dyes polyester fibres green shades having good fastness properties.

In an analogous manner there are obtained the dyestuffs of the formula

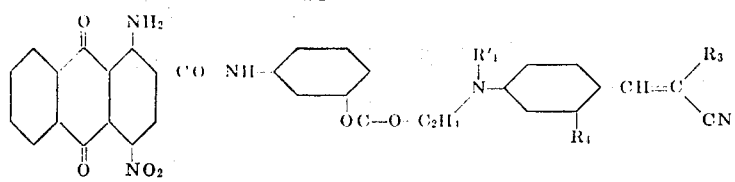

| $R_1'$ | $R_4$ | $R_3$ |
|---|---|---|
| —C$_2$H$_4$CN | —H | —CN |
| —C$_2$H$_4$CN | —H | —COOC$_2$H$_5$ |
| —C$_2$H$_5$ | —CH$_3$ | —SO$_2$—C$_6$H$_5$ |
| —CH$_2$C$_6$H$_5$ | —CH$_3$ | —CN |
| —C$_2$H$_5$ | —Cl | —CN |
| —C$_2$H$_5$ | —OCH$_3$ | —CONH$_2$ |
| —C$_2$H$_4$OCH$_3$ | —H | —CN |
| —C$_2$H$_4$OC$_2$H$_4$CN | —CH$_3$ | —CN |
| —C$_2$H$_4$—C$_6$H$_5$ | —CH$_3$ | —CN |
| —C$_2$H$_4$—O—CO—C$_6$H$_5$ | —CH$_3$ | —CN |
| —C$_2$H$_4$—O—CO—C$_6$H$_4$—Cl(—p) | —CH$_3$ | —CN |
| —C$_2$H$_4$—O—CO—C$_2$H$_5$ | —CH$_3$ | —CN |
| —C$_2$H$_4$—O—CO—O—C$_2$H$_5$ | —CH$_3$ | —CN |
| —C$_2$H$_4$—O—CO—NH—C$_4$H$_9$ | —CH$_3$ | —CN |

Manufacturing the styryl dyestuff

4 Parts of the product of the formula

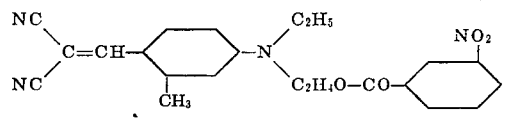

(prepared by acylating the β-hydroxyethyl compound with meta-nitrobenzoylchloride) in acetonitrile are hydrogenated with a catalyst of 10 % palladium on carbon until the quantity of hydrogen needed to reduce the nitro group has been absorbed. No more starting material can be identified in the thin-layer chromatogram. The acetonitrile is distilled off and the residue worked up, to yield the dyestuff of the formula

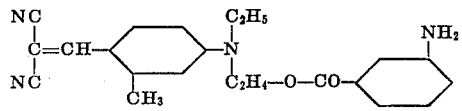

The para- and ortho-aminobenzoyl esters are obtained in a similar manner. The styryl dyestuffs, in which the N-ethyl group is replaced by a substituted alkyl group, are obtained by using the suitably modified starting compounds.

EXAMPLE 3

5.65 Parts of the product of formula (II) mentioned in Example 1 and 2.26 parts of chloroacetylchloride in nitrobenzene are stirred for 20 hours at 90° to 95° C. After cooling, the batch is suction-filtered, washed with methanol and dried, to yield a product of the formula

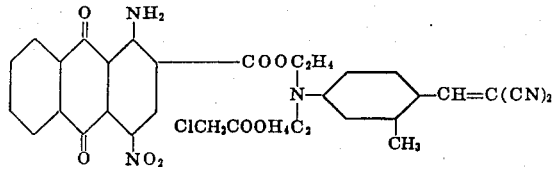

which dyes polyester fibres yellow shades.

The catalytic hydrogenation of 1.9 parts of this product in 25 parts of dimethylformamide with Raney nickel until the theoretical quantity of hydrogen gas has been absorbed gives an almost quantitative yield of a dyestuff of the formula

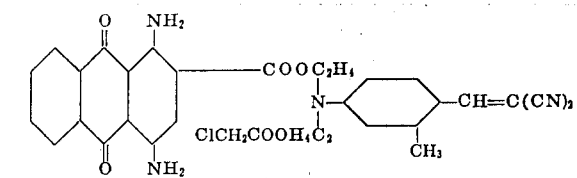

which dyes polyester and nylon fibres vivid green shades having good fastness properties.

EXAMPLE 4

3.5 Parts of 1,5-dihydroxy-4,8-dinitroanthraquinone and 7.5 parts of a styryl dyestuff of the formula

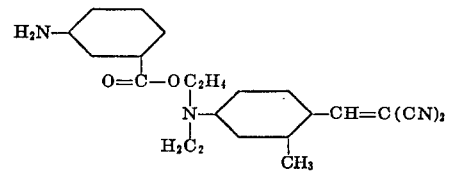

in nitrobenzene are stirred for 20 hours in a bath maintained at 180° C with a catalytic quantity of copper-(I)-chloride. After cooling, the mixture is poured into methanol. The precipitated dyestuff is suctioned off and the filter cake boiled in methanol, suctioned off, washed with methanol and dried, to yield a dyestuff of the formula

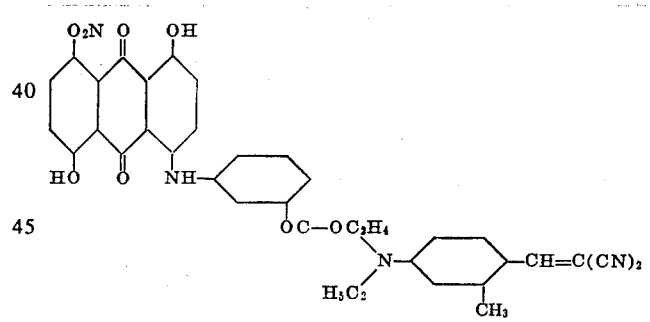

which dyes polyester fibres green shades.

When this dyestuff is reduced catalytically with Raney nickel in dimethylformamide until the theoretical quantity of hydrogen has been absorbed, the nitro group is reduced to the amino group and the resulting dyestuff likewise dyes polyester fibres brilliant green shades.

In an analogous manner there are obtained the dyestuffs of the formula

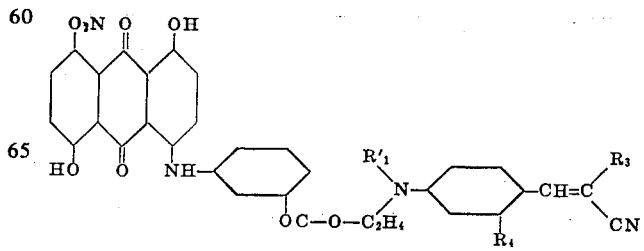

| R'₁ | R₄ | R₃ |
|---|---|---|
| —C₂H₄CN | —H | —CN |
| —C₂H₄CN | —H | —COOC₂H₅ |
| —C₂H₅ | —CH₃ | —SO₂—C₆H₅ |
| —CH₂C₆H₅ | —CH₃ | —CN |
| —C₂H₅ | —Cl | —CN |
| —C₂H₅ | —OCH₃ | —CONH₂ |
| —C₂H₄OC₂H₄CN | —CH₃ | —CN |
| —C₂H₄—C₆H₅ | —CH₃ | —CN |
| —C₂H₄OCH₃ | —H | —CN |
| —C₂H₄—O—CO—C₅H₆ | —CH₃ | —CN |
| —C₂H₄—O—CO—C₂H₅ | —CH₃ | —CN |
| —C₂H₄—O—CO—O—C₂H₅ | —CH₃ | —CN |
| —C₂H₄—O—CO—NH—C₄H₉ | —CH₃ | —CN |

EXAMPLE 5

When the product of the formula (II) mentioned in Example 1 is subjected to catalytic reduction with Raney nickel in dimethylformamide, the dyestuff of the formula

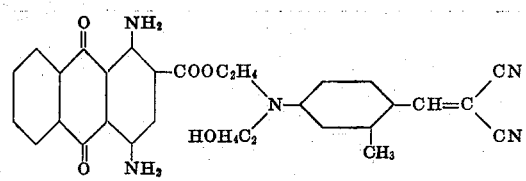

is obtained; it dyes polyester fibres brilliant green shades having excellent fastness properties.

One Part of the resulting dyestuff is ground wet with two parts of an aqueous solution of 50 % strength of the sodium salt of dinaphthylmethane-disulphonic acid and then dried.

This dyestuff preparation is stirred with 40 parts of an aqueous solution of 10 % strength of the sodium salt of N-benzyl-μ-heptadecyl-benzimidazole-disulphonic acid and four parts of 40 % acetic acid solution are added. This batch is diluted with water to form a dyebath of 4,000 parts.

100 Parts of a cleaned polyester fibre fabric are immersed in this dyebath at 50° C, the temperature is raised to 120° to 130° C during half an hour and dyeing is carried out in a closed vessel for 1 hour at this temperature. The material is then thoroughly rinsed. The resulting brilliant green dyeing has excellent properties of fastness to light and sublimation.

EXAMPLE 6

When 33 parts of 1-amino-4-nitro-anthraquinone-2-carboxylic acid chloride are reacted with 13.5 parts of the styryl dyestuff of the formula (I) mentioned in Example 1, followed by catalytic reduction as described in Example 1, the dyestuff of the formula

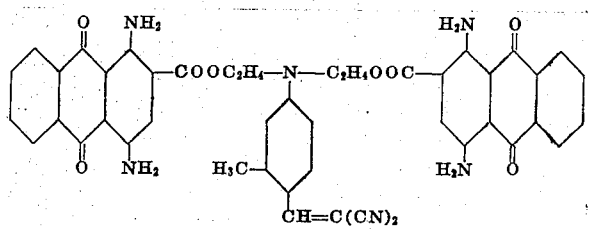

is obtained which also dyes polyester fibres fast green shades.

20 Parts of this dyestuff are ground with 140 parts of water containing 40 parts of sodium dinaphthylmethanedisulphonate.

A padding liquor is prepared from 200 parts of the above dyestuff preparation, 100 parts of carboxymethyl-cellulose (4 % aqueous solution) and 700 parts of water by stirring the dyestuff preparation described above into the previously diluted thickening by means of a high-speed stirrer, and the mixture is then adjusted to a pH-value of 6 by means of acetic acid of 80 % strength. A fabric of polyester fibres is padded in this liquor at 30° C and then expressed to a weight increase of 60 %, and then dried at 70° to 80° C. The fabric is then heated on a tenter frame for 60 seconds at 210° C, then washed in hot water and thoroughly rinsed in cold water. A green dyeing of good fastness properties is obtained.

EXAMPLE 7

A mixture of 7.2 parts of 1-amino-4-bromoanthraquinone-2-carboxylic acid chloride and 7.5 parts of the styryl dyestuff of the formula

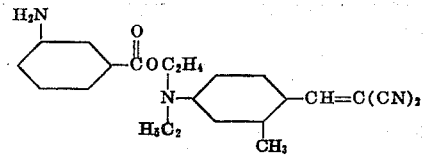

in 50 parts by volume of chlorobenzene is stirred and refluxed for 16 hours, then cooled and the residue is filtered off and washed with benzene. After drying, there are obtained 12.2 parts of the dyestuff of the formula

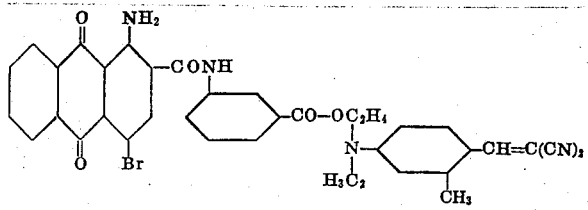

which dyes polyester fibres strong, brilliant orange shades.

EXAMPLE 8

A mixture of 3.5 parts of 1,5-dihydroxy-4,8-dinitroanthraquinone, 8 parts of the styryl dyestuff of the formula

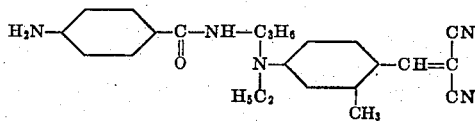

and a catalytic quantity of copper-(I)-chloride in nitrobenzene is stirred for 24 hours on an oilbath at 180° C, then cooled, stirred into methanol and suctioned. The residue is boiled in methanol, filtered while warm, washed with methanol and dried, to yield a green dyestuff of the formula

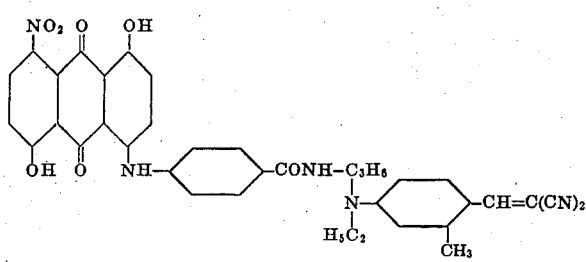

which on reduction with Raney nickel in dimethylformamide until the calculated quantity of hydrogen gas has been absorbed yields a green dyestuff of the formula

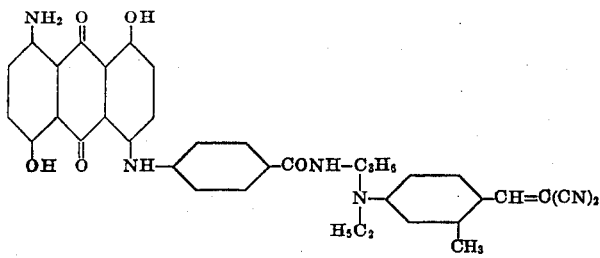

Instead of 1,5-dihydroxy-4,8-dinitroanthraquinone it is possible to use 1,8-dihydroxy-4,5-dinitroanthraquinone or a mixture of these two anthraquinone derivatives, whereby in an analogous manner green dyestuffs are obtained.

The styryl dyestuff used above can be manufactured in the following manner:
reduction of N-cyanoethyl-N-ethyl-m-toluidine in liquid ammonia under super-atmospheric pressure to form N-γ-aminopropyl-N-ethyl-m-toluidine; reaction of the amino group with para-nitrobenzoylchloride; formylation according to Vilsmeyer to form the aldehyde; condensation of the aldehyde with malodinitrile and reduction of the nitro group with hydrogen in the presence of Raney nickel in dimethylformamide.

We claim:
1. An anthraquinoid dyestuff which corresponds to the formula

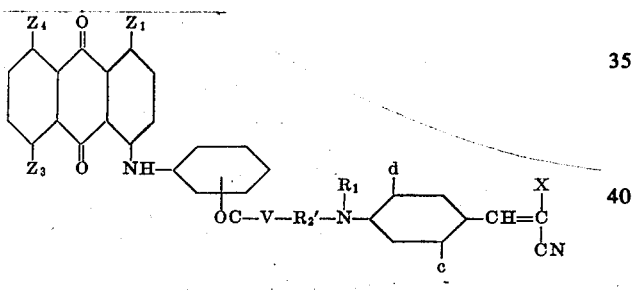

in which
$Z_1$ is OH, $NH_2$ or $NHR_3$ where $R_3$ is methyl or ethyl,
$Z_2$ is $NO_2$, Br, $NH_2$ or $NHR_3$ where $R_3$ is methyl or ethyl,
$Z_3$ and $Z_4$ are each, independently, $NO_2$, OH, $NH_2$ or $NHR_3$ where $R_3$ is methyl or ethyl,
V is -O- or -NH-,
$R_2'$ is $C_1$-$C_4$-alkylene,
$R_1$ is unsubstituted $C_1$-$C_4$ alkyl or $C_1$-$C_4$ alkyl substituted by
cyano, chloro, $C_1$-$C_4$ alkoxy, hydroxy, $C_1$-$C_4$ alkoxycarbonyl, $C_1$-$C_4$ alkylcarbonyloxy, $C_1$-$C_4$-alkylcarbamoyloxy, phenylcarbamyloxy, $C_1$-$C_4$ alkoxycarbonyloxy, phenyloxycarbonyloxy, cyanoethoxy, phenyl, chloracetoxy, or benzoyloxy,
c and d are each, independently, H, Cl, $CH_3$, $C_2H_5$, $OCH_3$, $OC_2H_5$, phenylthio or phenoxy,
and
X is carb($C_1$-$C_4$)alkoxy, carbonamido, N-methylcarbonamido, N,N-dimethylcarbonamido, phenylsulfonyl or cyano.

2. An anthraquinoid dyestuff as claimed in claim 1, wherein V is -O-, and c and d are each, independently, H, -$CH_3$, -$OCH_3$, or Cl.

3. An anthraquinoid dyestuff as claimed in claim 1 of the formula

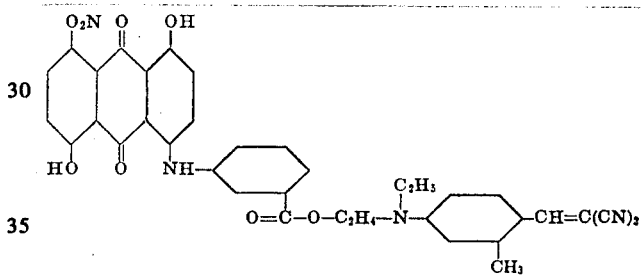

4. An anthraquinoid dyestuff as claimed in claim 2 of the formula

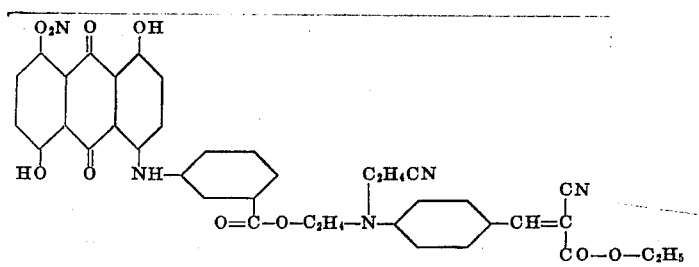

5. An anthraquinoid dyestuff as claimed in claim 1 of the formula

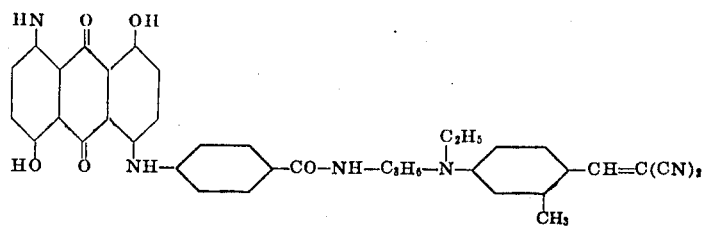

* * * * *